Patented July 26, 1932

1,868,920

UNITED STATES PATENT OFFICE

OTTO SCHMIDT AND OTTO GROSSKINSKY, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF CARBON BLACK

No Drawing. Application filed April 21, 1930, Serial No. 446,166, and in Germany December 31, 1927.

This application is a continuation in part of the application Serial No. 328,613 filed Dec. 26th, 1928, and relates to an invention for improvements in the manufacture and production of carbon black.

Carbon black has hitherto been almost exclusively produced by the incomplete combustion of hydrocarbons. There are, however, very great drawbacks in this method, because a considerable portion of the initial materials is always burned away in the process, and another portion becomes graphitized by the large amount of heat produced in the combustion, so that, under certain conditions, a considerable amount of the carbon black is rendered unsuitable for finer uses, such as for coloring purposes or in the rubber industry, and the like.

We have now found that these drawbacks are obviated and very high grade carbon black is obtained by dissociating into carbon and hydrogen hydrocarbons of unsaturated character, such as olefines, diolefines, and in particular the gaseous unsaturated hydrocarbons, or gases containing the same, with dehydrogenating catalysts, preferably comprising a metal of the iron group which expression includes a compound of the metal reducible to the metallic state under the conditions of working, such as an oxide, at a low or a moderately elevated decomposition temperature, for example at temperatures of between about 100° and 300° C., but usually at temperatures of between about 300° and 450° C., but, if desired, at temperatures of up to about 600° C., in the gaseous phase and by a rarefaction of the said unsaturated hydrocarbons, which expression does not only comprise the working under a subatmospheric pressure but also by the addition to the unsaturated hydrocarbons under any desired pressure, of other gases or vapors, such as hydrogen, nitrogen, carbon monoxide, carbon dioxide, water vapor, methane, ethane, napthalene, nitrogen peroxide and the like and likewise the combination of these two methods, since also by the said addition the gas is rarefied with reference to the state in which it would exist under the same pressure. The said rarefaction involves the great advantage that the heat evolved by the dissociation of the unsaturated hydrocarbons is taken up by the diluting gases and thus does not allow the temperature to rise to such a height as would impair the quality of the carbon black to be produced. In the case of working under subatmospheric pressure the heat evolved is reduced with reference to the reaction space and may easily be taken up by the walls of the reaction vessel and by the catalysts. The rarefaction therefore permits the temperatures to be kept within desired limits. Gases consisting of or containing free oxygen should not be present in substantial amounts in the unsaturated hydrocarbons to be converted, since in this case not a decomposition by dissociation but a partial combustion would take place. Hydrogen in comparatively small amounts does not exert a hydrogenating action under the conditions of working employed according to our invention because most of the unsaturated hydrocarbons under treatment ultimately undergo decomposition to carbon black and no substantial formation of saturated hydrocarbons takes place by the action of said hydrogen. The said unsaturated hydrocarbons may also be derived from the thermal decomposition or partial combustion of gaseous aliphatic hydrocarbons, such as methane, ethane or propane or of gases containing the same, for example, natural gases, such as occur so abundantly in the United States of America. The metals of the iron group, namely cobalt, nickel or iron, serving as catalysts according to the present invention may be employed, either alone or in conjunction with other additions. Reducible metal oxides, such as cobalt oxide, nickel oxide or iron oxide and the like, which by the action of the hydrogen formed during the reaction are brought into a reduced state i. e. into the metallic state or into the state of a lower oxide, and, to which still further substances having an activating action may be added, are also suitable for employment as catalysts. Suitable additions comprise, for example, metal oxides or hydroxides, such as cadmium oxide, copper oxide, vanadium oxide, chromic oxide, zinc oxide, uranium oxide, alumina, manganous oxide, thorium oxide, caustic alkalies, and the like, or salts, such as silicates, chromates, molybdates, tungstates, or the like. As excellent catalysts may be mentioned catalysts containing cobalt, which may be obtained by reduction of compounds of cobalt with hydrogen at a moderately elevated temperature, and which may be provided with activating additions, such as the oxides or hydroxides of zinc, cadmium, copper, chromium, vanadium, molybedenum, uranium and the metals of the alkalies and the alkaline earths. The catalysts may be employed in a homogenous state or in conjunction with carriers. Catalysts which have been subjected to a moulding process are advantageous.

Among the unsaturated hydrocarbons the olefines, such as ethylene and its homologues, are particularly suitable, but diolefines, such butadiene and its homologues, may also be used as the initial materials and saturated hydrocarbons, such as ethane, propane, benzine fractions and the like may also be added. It is often advisable to take care that the carbon black formed during the decomposition is removed from the reaction chamber as quickly as possible. This is most easily effected by mechanical means, though the removal may also be effected by maintaining the highest possible gas velocity in the reaction zone. Useful carbon black may, however, also be produced without these precautionary measures.

Particularly excellent results are obtained according to this method of working with catalysts containing cobalt. The carbon black obtained according to this method of working is distinguished by its particles having a very small size, that is to say, of its having a very fine state of dispersion. On this account it has a very deep black color and is suitable as an admixture in the vulcanization of rubber articles, such as are produced both from crude rubber and from the plastic or resilient polymerization products of diolefines.

The carbon black produced by the decomposition of unsaturated hydrocarbons according to the process of the present invention, and in particular that obtained in the presence of catalysts containing cobalt, is adapted for the production of colored compositions, such as printing inks, endorsing inks and the like, and as already stated, also for use in the rubber industry. The said carbon black is very similar in its properties to that obtained by partial combustion of hydrocarbons, and is thus considerably superior in its properties to the carbon blacks which have hitherto been obtained by other processes of thermal decomposition. Moreover, since the carbon black prepared in this manner is far more easily and conveniently obtainable than that hitherto prepared by partial combustion, its application for the said purposes constitutes a substantial technical improvement.

A rarefaction of the unsaturated hydrocarbons, in accordance with the present invention has the great advantage that a considerable increase in the yield of carbon black is often attained thereby. Furthermore, the temperature can be better regulated. The quality of the carbon black is also improved by the said measure.

The following examples will further illustrate how the said invention may be carried out in practice, though it is understood that the invention is not limited to these merely typical examples. The parts are by weight unless otherwise stated.

*Example 1*

A mixture of 2 parts by volume of ethylene with an addition of 1 part by volume of hydrogen, compressed at 90 atmospheres, is passed, at a temperature of about 100° C., over a catalyst composed of finely divided nickel deposited on kieselguhr. The ethylene decomposes, with violent liberation of heat and an increase in pressure, into methane and carbon, the latter being obtained in the form of a valuable carbon black, practically free from nickel. The amount of the hydrogen originally employed suffers practically no change, and there is practically no ethane present in the reaction gases. In this case also, care must be taken, by cooling, to prevent the rise in temperature becoming excessive.

Diluents, such as carbon monoxide, carbon dioxide, steam, methane, nitrogen, and the like, may be employed in place of hydrogen.

The nickel may also be replaced by cobalt or iron or the like which, when employed in a fine, coarse or activated condition, also furnish good results. The formation of carbon black can also be effected by adding small amounts of nickel carbonyl, iron carbonyl, or other volatile compounds of metals of the iron group, and heating. The carbon black thus obtained is deep black in color and 100 cubic centimeters of the loosely heaped product weigh about 10 grams. The product has the property of imparting a particularly high elasticity to rubber or polymerization products of diolefines when employed as an admixture therewith.

Thus, if 100 parts of a plastic polymerization product of butadiene together with 25 parts of magnesium oxide, 5 parts of sulphur and 0.5 part of a vulcanizing accelerator be intimately mixed with 40 parts of the carbon black prepared from ethylene in the manner described and the resulting sheet be vulcanized for 15 minutes at about 140° C., a technically valuable vulcanizate of high elasticity is obtained.

*Example 2*

A catalyst tube is filled with a layer of nickel balls, such as are obtained, for example, by squirting molten nickel into water with the aid of a squirt, and the catalyst is heated to a temperature of 500° C. after the air has been displaced from the tube with nitrogen. If ethylene is passed through the tube under a pressure of $\frac{1}{10}$ atmosphere, a very finely dispersed carbon black is obtained which can easily be separated from the nickel balls. The ethylene is completely decomposed into carbon black, hydrogen and a little methane.

*Example 3*

A horizontal catalyst tube, 3 centimeters in internal diameter, made of nickel plate, is charged with a layer of granules of pressed nickel oxide, until the layer is about 1½ centimeters in depth. After the catalyst has been heated in a current of nitrogen to a temperature of 400° C. a mixture of 1 part by volume of ethylene and 1 part by volume of added carbon dioxide is passed over the catalyst with a linear velocity of about 5 centimeters per second. In this way the ethylene is practically quantitatively converted to carbon black and hydrogen, containing an admixture of small amounts of methane. The carbon black is substantially free from nickel oxide, and after having been screened in a gas current, 100 cubic centimeters of the loosely heaped product weigh 9 to 10 grams.

*Example 4*

Several containers, the walls of which are provided with holes, and which are loosely charged with granules of pressed cobalt oxide are arranged in a horizontally arranged nickel tube 15 centimeters in diameter which is mounted so that it may be revolved about a horizontal axis. After the tube has been filled with nitrogen it is heated to about 400° C. while being revolved about its axis and a mixture of 1 part by volume of ethylene with 3 parts by volume of added nitrogen is thereupon passed through the tube. The carbon black settling in the reaction vessel is directly stripped off by means of scrapers or brushes and falls through an aperture in the wall of the vessel into a receptacle arranged below the said aperture. An excellent yield of a carbon black substantially free from cobalt and with excellent qualities is obtained.

*Example 5*

A mixture of 99 parts of cobalt oxide with 1 part of zinc oxide (obtained by precipitation of a solution of a mixture of the nitrates) is shaped by pressing and reduced with hydrogen at a temperature of 330° C. A mixture of 50 parts by volume of ethylene and 50 parts by volume of added methane is passed over this catalyst at a temperature of 400° C. in a not too rapid current. The carbon which separates out consists of a very deep black carbon black, the size of the crystallites which is smaller than 100 Angström units in diameter.

What we claim is:

1. A process for the production of carbon black from olefinic hydrocarbons, which comprises decomposing by dissociation the said initial material in a rarefied state in the gaseous phase with a dehydrogenating catalyst at a low to moderately elevated decomposing temperature.

2. A process for the production of carbon black from olefinic hydrocarbons, which comprises decomposing by dissociation the said initial material in a rarefied state in the gaseous phase with a dehydrogenating catalyst at a low to moderately elevated decomposing temperature not exceeding 600° C.

3. A process for the production of carbon black from olefinic hydrocarbons, which comprises decomposing by dissociation the said initial material in a rarefied state in the gaseous phase with a dehydrogenating catalyst comprising a metal of the iron group at a low to moderately elevated decomposing temperature.

4. A process for the production of carbon black from olefinic hydrocarbons, which comprises decomposing by dissociation the said initial material in a rarefied state in the gaseous phase with a dehydrogenating catalyst comprising a metal of the iron group at a low to moderately elevated decomposing temperature not exceeding 600° C.

5. A process for the production of carbon black from olefinic hydrocarbons, which comprises decomposing by dissociation a gas containing a substantial amount of the said initial material in a rarefied state in the gaseous phase with a dehydrogenating catalyst comprising a metal of the iron group at a low to moderately elevated decomposing temperature not exceeding 600° C.

6. A process for the production of carbon black from olefinic hydrocarbons, which comprises decomposing by dissociation the said initial material in a rarefied state in the gaseous phase with a dehydrogenating catalyst comprising a metal of the iron group at a low to moderately elevated decomposing temperature of between about 100° and 600° C.

7. A process for the production of carbon black from olefinic hydrocarbons, which comprises decomposing by dissociation the said initial material in a rarefied state in the gaseous phase with a dehydrogenating catalyst comprising a metal of the iron group at a low to moderately elevated decomposing temperature of between about 300° and 450° C.

8. A process for the production of carbon black from olefinic hydrocarbons, which comprises adding another gas containing no substantial amounts of free oxygen to the said initial material and treating the mixture with a dehydrogenating catalyst comprising a metal of the iron group at a temperature of between about 300° and 450° C.

9. A process for the production of carbon black from ethylene, which comprises adding a hydrocarbon gas to the ethylene and passing the mixture at a temperature of between 100° and 600° C. over a dehydrogenating catalyst comprising a metal of the iron group.

10. A process for the production of carbon black from ethylene, which comprises adding methane to the ethylene and passing the mixture at a temperature of between 300° and 450° C. over a catalyst comprising cobalt.

In testimony whereof we affix our signatures.

OTTO SCHMIDT.
OTTO GROSSKINSKY.